(12) United States Patent
Zhang et al.

(10) Patent No.: US 11,126,030 B2
(45) Date of Patent: Sep. 21, 2021

(54) DISPLAY PANEL, METHOD OF FABRICATING DISPLAY PANEL, DISPLAY DEVICE INCLUDING DISPLAY PANEL

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xiaozhe Zhang, Beijing (CN); Kun Lu, Beijing (CN); Chao Zhang, Beijing (CN); Xing Zhou, Beijing (CN); Ling Bai, Beijing (CN); Qifei Chen, Beijing (CN); Liangliang Ren, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/756,598

(22) PCT Filed: Nov. 28, 2019

(86) PCT No.: PCT/CN2019/121575
§ 371 (c)(1),
(2) Date: Apr. 16, 2020

(87) PCT Pub. No.: WO2020/147433
PCT Pub. Date: Jul. 23, 2020

(65) Prior Publication Data
US 2021/0232000 A1 Jul. 29, 2021

(30) Foreign Application Priority Data
Jan. 16, 2019 (CN) .......................... 201910039243.9

(51) Int. Cl.
*G02F 1/1335* (2006.01)
*G02F 1/13357* (2006.01)

(52) U.S. Cl.
CPC .. *G02F 1/133524* (2013.01); *G02F 1/133512* (2013.01); *G02F 1/133514* (2013.01);
(Continued)

(58) Field of Classification Search
CPC ................................................ G02F 1/133524
See application file for complete search history.

(56) References Cited

U.S. PATENT DOCUMENTS

2014/0300845 A1* 10/2014 Tamaki ............. G02F 1/133514
349/65
2019/0056548 A1 2/2019 Meng et al.
2019/0094575 A1 3/2019 Wang et al.

FOREIGN PATENT DOCUMENTS

CN 105785638 A 7/2016
CN 105785665 A 7/2016
(Continued)

OTHER PUBLICATIONS

Office Action dated Apr. 1, 2020, issued in counterpart CN Application No. 201910039243.9, with English Translation. (14 pages).
International Search Report dated Feb. 24, 2020, issued in counterpart Application No. PCT/CN2019/121575. (12 pages).

*Primary Examiner* — Edmond C Lau
(74) *Attorney, Agent, or Firm* — Westerman, Hattori, Daniels & Adrian, LLP

(57) ABSTRACT

The present disclosure generally relates to display technologies. A liquid crystal display panel includes: a light guide layer having a first refractive index, a refractive layer on the light guide layer, a first polarizing layer on the refractive layer, a color filter layer on the first polarizing layer, a liquid crystal layer on the color filter layer, and an array substrate on the liquid crystal layer. The refractive layer includes a
(Continued)

plurality of higher refractive index portions having a second refractive index and a plurality of lower refractive index portions having a third refractive index, the plurality of higher refractive index portions and the plurality of lower refractive index portions being arranged in an alternating manner. The liquid crystal display panel is configured to emit light substantially through the higher refractive index portions of the refractive layer.

19 Claims, 5 Drawing Sheets

(52) U.S. Cl.
CPC .. *G02F 1/133531* (2021.01); *G02F 1/133553* (2013.01); *G02F 1/133615* (2013.01)

(56) References Cited

FOREIGN PATENT DOCUMENTS

| | | | |
|---|---|---|---|
| CN | 106292052 A | 1/2017 | |
| CN | 106647042 A | 5/2017 | |
| CN | 106990604 A | 7/2017 | |
| CN | 107450234 A | 12/2017 | |
| CN | 108196336 A | 6/2018 | |
| CN | 108227285 A | 6/2018 | |
| CN | 108415191 A | 8/2018 | |
| CN | 208110209 U | 11/2018 | |
| CN | 109445176 A | 3/2019 | |
| JP | 2005-134498 A | 5/2005 | |
| TW | 200801696 A | 1/2008 | |

* cited by examiner

DISPLAY PANEL, METHOD OF FABRICATING DISPLAY PANEL, DISPLAY DEVICE INCLUDING DISPLAY PANEL

CROSS-REFERENCE TO RELATED APPLICATIONS

This application claims benefit of the filing date of Chinese Patent Application No. 201910039243.9 filed on Jan. 16, 2019, the disclosure of which is hereby incorporated in its entirety by reference.

TECHNICAL FIELD

The present disclosure generally relates to display technologies, and in particular, to liquid crystal display panel, a method of fabricating the liquid crystal display panel, and a liquid crystal display device.

BACKGROUND

Display technologies are becoming increasingly diverse, and display devices embodying new display technologies are regularly being introduced into the market and people's daily lives. Currently, the display technologies include two main categories: organic light-emitting diode (OLED) technology and liquid crystal display (LCD) technology.

BRIEF SUMMARY

The present disclosure provides liquid crystal display panel. The liquid crystal display panel may comprise a light guide layer having a first refractive index, a refractive layer on the light guide layer, a first polarizing layer on the refractive layer, a color filter layer on the first polarizing layer, a liquid crystal layer on the color filter layer, and an array substrate on the liquid crystal layer.

In at least some embodiments, the liquid crystal display panel may be configured to emit light substantially through the higher refractive index portions of the refractive layer.

In at least some embodiments, the refractive layer may comprise a plurality of higher refractive index portions having a second refractive index and a plurality of lower refractive index portions having a third refractive index. The plurality of higher refractive index portions and the plurality of lower refractive index portions may be arranged in an alternating manner.

In at least some embodiments, the second refractive index may be larger than the first refractive index. The third refractive index may be smaller than the first refractive index.

In at least some embodiments, a difference between the second refractive index and the first refractive index may be sufficient to couple light out of the light guide layer into the plurality of higher refractive index portions.

In at least some embodiments, a difference between the third refractive index and the first refractive index may be sufficient to cause total internal reflection at an interface between the light guide layer and the plurality of lower refractive index portions.

In at least some embodiments, the light guide layer may be composed of a transparent material.

In at least some embodiments, the light guide layer may be composed of glass.

In at last some embodiments, the liquid crystal display panel may further comprise a first base substrate on a side of the light guide layer opposite from the refractive layer. The first base substrate may have a fourth refractive index. The fourth refractive index may be smaller than the first refractive index.

In at least some embodiments, the first base substrate may be a reflective film.

In at least some embodiments, the color filter layer may comprise a plurality of black matrix portions and a plurality of color light structures. The plurality of black matrix portions and the plurality of color light structures may be arranged in an alternating manner. The plurality of black matrix portions may positionally correspond to the plurality of lower refractive index portions of the refractive layer. The plurality of color light structures may positionally correspond to the plurality of higher refractive index portions of the refractive layer.

In at least some embodiments, orthographic projections of the plurality of lower refractive index portions on the light guide layer may completely overlap with orthographic projections of the plurality of black matrix portions on the light guide layer. In at least some embodiments, orthographic projections of the plurality of higher refractive index portions on the light guide layer may completely overlap with orthographic projections of the plurality of color light structures on the light guide layer.

In at least some embodiments, the refractive layer may comprise a plurality of black matrix portions and a plurality of color light structures.

In at least some embodiments, the plurality of black matrix portions may constitute the plurality of lower refractive index portions.

In at least some embodiments, the plurality of color light structures may constitute the plurality of higher refractive index portions.

In at least some embodiments, a thickness of the light guide layer may be from 100 nm to 10 µm.

In at least some embodiments, the array substrate may comprise a second polarizing layer. A polarization axis of the first polarizing layer may be perpendicular to a polarization axis of the second polarizing layer.

The present disclosure also provides a display device. The display device may comprise a display panel as described above. The display device may further comprise an edge light source on an end surface of the light guide layer.

In at least some embodiments, the edge light source may be configured to emit a collimated light.

The present disclosure also provides a method of fabricating a display panel. The display panel may be as described above. The method may comprise forming the light guide layer; forming the refractive layer on the light guide layer; and forming the first polarizing layer on the refractive layer.

In at least some embodiments, the forming of the refractive layer may comprise: applying a layer of lower refractive index material on the light guide layer, and performing a first patterning step to form the plurality of lower refractive index portions; and applying a layer of higher refractive index material on the light guide layer, and performing a second patterning step to form the plurality of higher refractive index portions.

In at least some embodiments, the lower refractive index material may be a black matrix material.

In at least some embodiments, the higher refractive index material may be a photoresist having a larger refractive index than the first refractive index.

In at least some embodiments, the method may further comprise, before forming the light guide layer, providing a reflective layer. The light guide layer may be formed on the reflective layer.

In at least some embodiments, the method may further comprise forming a first base substrate out of a material having a smaller refractive index than the first refractive index.

The light guide layer may be formed on the first base substrate.

In at least some embodiments, the material forming the first base substrate may be a reflective material.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the present disclosure are apparent from the following detailed description taken in conjunction with the accompanying drawings in which:

Figure 1:
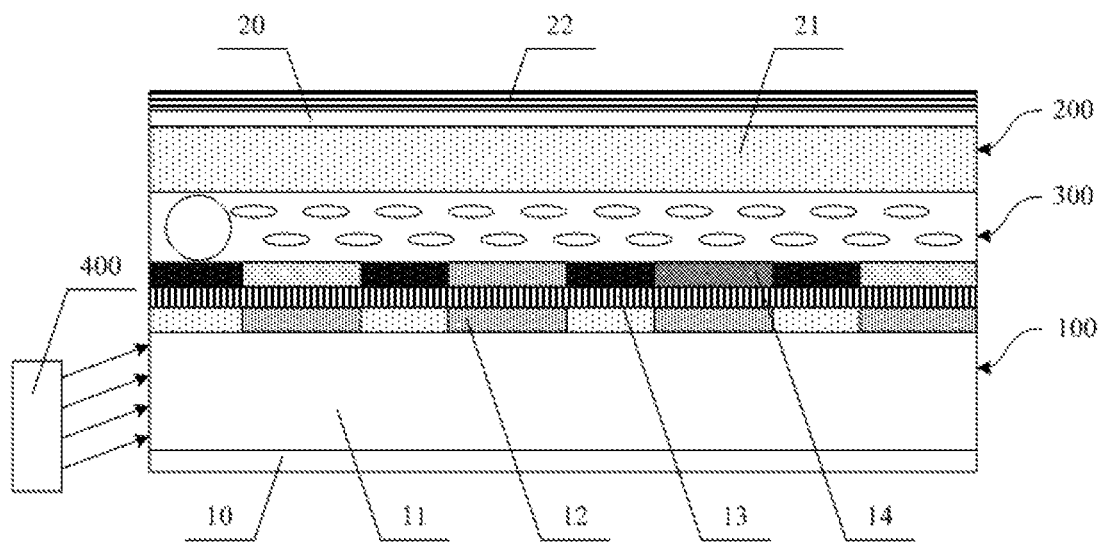
FIG. 1 shows a schematic diagram of a liquid crystal display panel according to an embodiment of the present disclosure.

The various features of the drawings are not to scale as the illustrations are for clarity in facilitating one skilled in the art in understanding the invention in conjunction with the detailed description.

DETAILED DESCRIPTION

Next, the embodiments of the present disclosure will be described clearly and concretely in conjunction with the accompanying drawings, which are described briefly above. The subject matter of the present disclosure is described with specificity to meet statutory requirements. However, the description itself is not intended to limit the scope of this disclosure. Rather, the inventors contemplate that the claimed subject matter might also be embodied in other ways, to include different steps or elements similar to the ones described in this document, in conjunction with other present or future technologies.

While the present technology has been described in connection with the embodiments of the various figures, it is to be understood that other similar embodiments may be used or modifications and additions may be made to the described embodiments for performing the same function of the present technology without deviating therefrom. Therefore, the present technology should not be limited to any single embodiment, but rather should be construed in breadth and scope in accordance with the appended claims. In addition, all other embodiments obtained by one of ordinary skill in the art based on embodiments described in this document are considered to be within the scope of this disclosure.

Display technologies are becoming increasingly diverse, and display devices embodying new display technologies are regularly being introduced into the market and people's daily lives. Currently, the display technologies include two main categories: organic light-emitting diode (OLED) technology and liquid crystal display (LCD) technology.

LCD is commonly incorporated in flat-screen display devices. LCD display panels are small, energy-efficient, radiation-free, and relatively inexpensive to manufacture. These advantages combine to make LCD a major focus in the development of display technologies, and an increasingly preferred technology in high-performance display systems.

An LCD display device usually includes a display panel and a backlight unit. The display panel may include an array substrate (for example, a thin film transistor layer) and a color filter substrate, which are arranged to be opposite from each other. A liquid crystal layer is between the array substrate and the color filter substrate. In conventional technologies, quality image displays are obtained by providing a polarizing layer on a side of each of the array substrate and the color filter substrate opposite from the liquid crystal layer. The polarizing layers are configured to selectively transmit linearly polarized light. An optical film is often provided on both the top and bottom surfaces of the polarizing layer, in order to protect the polarizing layer from external interferences during operation. Since the optical films must be adhered to the array substrate and the color filter substrate, an adhesive layer is formed on the surface of each optical film to facilitate adhesion. The backlight unit is provided on one side of the array substrate or the color filter substrate, and may include a light source, a light guide plate, an optical film, and a light guide frame. The surface of the light guide plate is formed with a dot pattern configured to diffuse point light or line light into planar light. The thickness of the light guide plate is usually on the level of several millimeters. The optical film may include a prism layer, and is configured to improve the brightness of the display from the viewer's viewpoint. The light guide frame is configured to secure the light source and the light guide plate.

It is evident from the above descriptions that conventional display technologies are ill-adapted to the growing trend of thin and ultrathin displays. What is more, the structural complexity of conventional display technologies may not be desirable under certain circumstances.

The present disclosure provides a liquid crystal display panel, a method of fabricating the liquid crystal display panel, and a liquid crystal display device. Instead of the light guide plate in conventional display technologies, embodiments of the present disclosure are provided with a first substrate that comprises a light guide layer and a first polarizing layer. In addition, instead of the polarizing plate in conventional display technologies, which is usually external to the display panel, the present disclosure provides a polarizing layer that is internal to the display panel. The present disclosure makes it possible to effectively reduce the overall thickness of the display panel, so as to better comport with the growing market demands for thinner products. Further, by greatly simplifying the structure of the display panel, the present disclosure also simplifies the manufacturing, lowers the production costs of the display panel, and improves the applicability of the display panel.

The present disclosure provides a liquid crystal display panel. Generally, the liquid crystal display panel comprises a first substrate and a second substrate on the first substrate. The first substrate comprises a light guide layer, a refractive layer, and a first polarizing layer arranged in a stack. The refractive layer is configured to couple light out of the light guide layer at the position of each subpixel, and to direct the light to emit through the second substrate.

FIG. 1 shows a schematic diagram of a liquid crystal display panel according to an embodiment of the present disclosure.

As shown in FIG. 1, the display panel comprises the first substrate 100, the second substrate 200 on the first substrate 100, and a liquid crystal layer 300 between the first substrate 100 and the second substrate 200.

The first substrate 100 comprises a first base substrate 10 and a light guide layer 11 on the side of the first base substrate 10 facing the second substrate 200. The first substrate 100 further comprises a refractive layer 12 on the light guide layer 11, a first polarizing layer 13 on the refractive layer 12, and a color filter layer 14 on the first polarizing layer 13. The light guide layer 11, the refractive layer 12, the first polarizing layer 13, and the color filter layer 14 form a stack on the first base substrate 10, and the direction in which the layers are arranged (that is, stacked on each other) defines the "stack direction".

The light guide layer 11 is coupled to an edge light source 400 on at least one of the two end surfaces of the light guide layer 11 that are perpendicular to the stack direction. The edge light source 400 is configured to emit incident light from the end surfaces into the light guide layer 11. Because the present disclosure does not rely on a backlight unit, the thickness of the display panel may be significantly reduced to fit in a thin or ultrathin display device. In some embodiments, the light guide layer 11 is composed of glass.

The refractive layer 12 is configured to couple incident light out of the light guide layer 11 at the position corresponding to each subpixel.

The first polarizing layer 13 is configured to selectively transmit linearly polarized light in the incident light from the light guide layer 11.

The color filter layer 14 comprises a plurality of pixels. Each of the plurality of pixels comprises a black matrix (140 in FIG. 3), and a red light structure (R, 141 in FIG. 3), a green light structure (G, 142 in FIG. 3), and a blue light structure (B, 143 in FIG. 3), which form the red, green, and blue subpixels, respectively. The red, green, and blue light structures are arranged in an alternating manner, and with the black matrix provided between adjacent light structures. The order in which the red, green, and blue light structures are arranged is not particularly limited, and the red, green, and blue light structures may be arranged in any appropriate pattern depending on need and specific implementations of the display panel. The black matrix is configured to shield light. The red, green, and blue light structures each comprises a filter configured to selectively transmit red, green, and blue light, respectively.

In some embodiments, the first substrate 100 does not comprise the color filter layer 14, and the color filter layer 14 is provided in the second substrate 200. In some embodiments, each pixel comprises four subpixels. For example, each pixel may comprise a red subpixel, a green subpixel, a blue subpixel, and a white subpixel.

As shown in FIG. 1, the second substrate 200 comprises a second base substrate 20, and an array substrate 21 on a side of the second base substrate 20 closest to the first substrate 100. A second polarizing layer 22 is provided on a side of the second base substrate 20 opposite or farthest from the first substrate 100.

The structure and configuration of the array substrate 21 are not particularly limited. The array substrate 21 may be structured and configured in any suitable manner known to a person of ordinary skill in the art depending on the specific implementation of the display panel. For example, the array substrate 21 may be a multi-layer structure that comprises a gate line, a data line, a thin film transistor, a pixel electrode, and a common electrode. The thin film transistor may be a top gate structure or a bottom gate structure. The thin film transistor may be amorphous silicon thin film transistor (a-Si TFT), low temperature poly-silicon thin film transistor, an oxide thin film transistor, or any suitable thin film transistor known to a person of ordinary skill in the art.

The second polarizing layer 22 is provided on a side of the second base substrate 20 opposite or farthest from the first substrate 100. The transmission axis (that is, the polarization axis) of the second polarizing layer 22 is perpendicular or substantially perpendicular to the transmission axis (that is, the polarization axis) of the first polarizing layer 13. Here, "substantially perpendicular" means being within +10° from a perpendicular direction.

Figure 2:
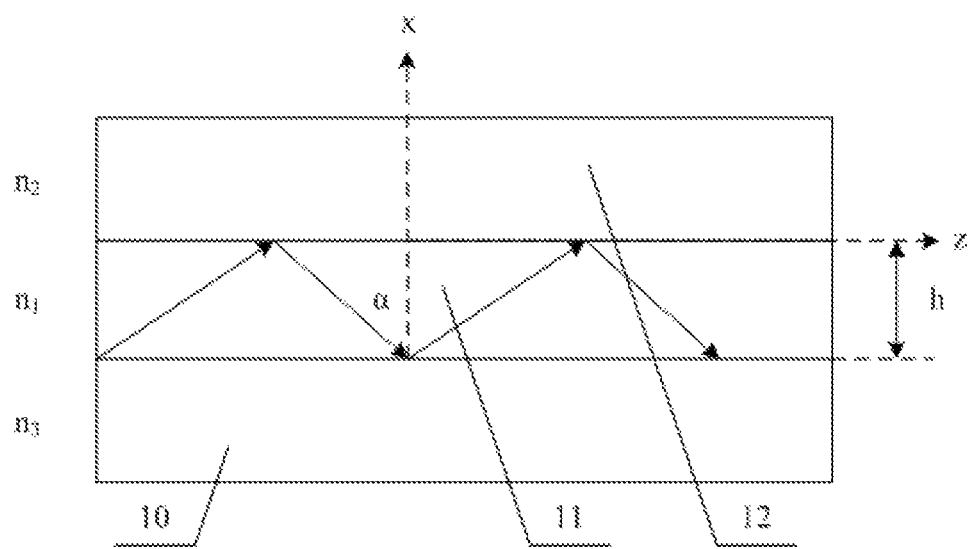
FIG. 2 shows a schematic diagram illustrating the principles of operation of a light guide layer according to an embodiment of the present disclosure.

FIG. 2 shows a schematic diagram illustrating the principles of operation of a light guide layer according to an embodiment of the present disclosure. Optical waveguides are a common element in optical communication and integrated optic technologies. In embodiments of the present disclosure, the light guide layer 11 is configured as an optical waveguide.

As shown in FIG. 2, the light guide layer 11 is between the first base substrate 10 and the refractive layer 12. The first base substrate 10, the light guide layer 11, and the refractive layer 12 constitute a planar waveguide.

The refractive index of the light guide layer 11 is $n_1$. The refractive index of the first base substrate 10 is $n_3$. The refractive indices of the light guide layer 11 and the first base substrate 10 satisfy the following relationship:

$$n_1 > n_3.$$

Figure 3:
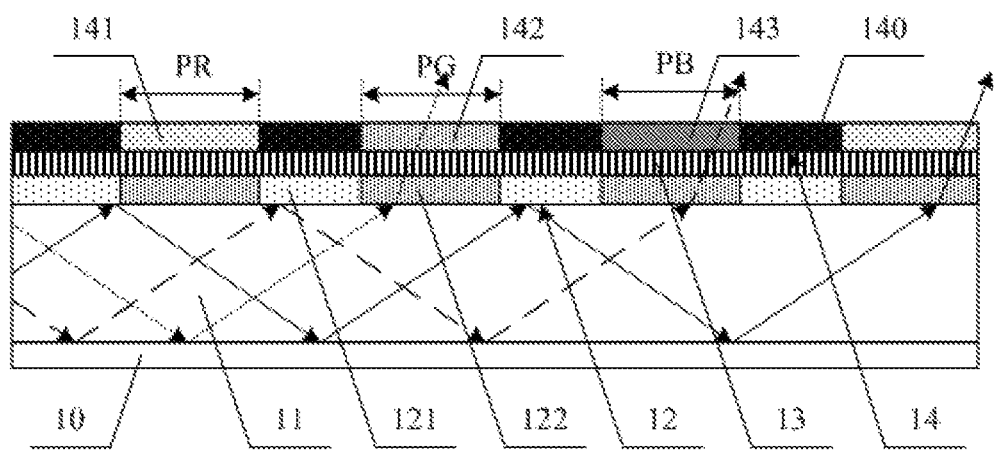
FIG. 3 shows a schematic diagram illustrating the principles of operation of a first substrate according to an embodiment of the present disclosure.

The refractive layer 12 comprises a plurality of lower refractive index portions 121 and a plurality of higher refractive index portions 122 arranged in an alternating manner, for example, as shown in FIG. 3. Also as shown in FIG. 3, the lower refractive index portions 121 positionally correspond to the black matrix 140 in the color filter layer 14, and the higher refractive index portions 122 positionally correspond to the red light structures 141, the green light structures 142, and the blue light structures 143. The refractive indices of the lower refractive index portions 121 and the higher refractive index portions 122 are $n_2$ and $n_4$, respectively.

The refractive indices of the lower refractive index portions 121 of the refractive layer and the light guide layer 11 satisfy the following relationship:

$$n_1 > n_2.$$

The refractive indices of the higher refractive index portions 122 of the refractive layer 12 and the light guide layer 11 satisfy the following relationship:

$$n_1 < n_4.$$

When light travels from a medium having a higher refractive index to a medium having a lower refractive index, if the incident angle is greater than the critical angle, the incident light will be totally reflected at the interface between the media. In embodiments of the present disclosure, at the interface between the light guide layer 11 and the refractive layer 12, the critical angle $\alpha_0$ can be determined according to the following formula:

$$\sin \alpha_0 = n_2/n_1$$

By adjusting the incident angle of light entering the light guide layer 11 to be larger than critical angle $\alpha_0$=arcsin $n_2/n_1$, and taking advantage of total internal reflection, it becomes possible to limit the propagation of light entering the light guide layer 11 to within the light guide layer 11.

The path of light in the planar waveguide follows a Z-shaped path through the light guide layer 11 as a result of total internal reflection at the interface between the light guide layer 11 and the first base substrate 10, and total reflection at the interface between the light guide layer 11 and the refractive layer 12. When light is traveling through the light guide layer 11 along the z direction, the light is unaffected in the x direction.

In some embodiments, the light guide layer 11 is composed of a transparent material, including, but not limited to, $Si_3N_4$ and the like. The transparent material preferably has a high refractive index. But it is understood that the present disclosure does not particularly limit the composition of the light guide layer 11, so long as the refractive index of the light guide layer 11 relative to the first base substrate 10 and the refractive layer 12 satisfies the requirements set forth in the present disclosure. For example, in a non-limiting embodiment, the light guide layer 11 may be composed of glass having a refractive index of 1.5, and the refractive layer 12 is formed with a plurality of lower refractive index portions 121 composed of $SiO_2$ having a refractive index of 1.45 that is lower than the refractive index of the light guide layer 11, and a plurality of higher refractive index portions 122 composed of $Al_2O_3$ having a refractive index of 1.76-1.768 that is higher than the refractive index of the light guide layer 11. It is further understood that the refractive index of a particular component layer of the display panel of the present disclosure may be adjusted by any appropriate means known to a person of ordinary skill in the art. For instance, the optical properties of a component layer may be changed by doping or coating the layer with the appropriate materials.

In some embodiments, the thickness (h) of the light guide layer 11 is between 100 nm to 10 μm. It is however understood that the thickness of the light guide layer 11 is not particularly limited, and may be adjusted as appropriate based on need and/or specific implementation of the display panel. The light guide layer 11 may be a single-layered structure, or a multi-layered structure.

As shown in FIG. 2, the first base substrate 10 and the refractive layer 12 functions as auxiliary waveguides. Light emitted by the edge light source 400 cannot be absolutely collimated, and is expected to exhibit a small divergence angle. A portion of the light emitted by the edge light source 400 will also enter the first base substrate 10 and the refractive layer 12. However, light entering the first base substrate 10 and the refractive layer 12 have smaller divergence angle, and the refractive indices of the first base substrate 10 and the refractive layer 12 are smaller than the refractive index of the light guide layer 11. As a result, light in the first base substrate 10 and the refractive layer 12 is less bounded by those layers, and will continuously "leak" back into the light guide layer 11. In some embodiments, the first base substrate 10 is a reflective film composed of a suitable reflective material (for example, a silver-plated reflective film, and the like).

FIG. 3 shows a schematic diagram illustrating the principles of operation of a first substrate according to an embodiment of the present disclosure.

As shown in FIG. 3, the color filter layer 14 comprises the black matrix 140, and a plurality of red light structures 141, a plurality of green light structures 142, and a plurality of blue light structures 143 arranged according to a predetermined pattern.

The refractive layer 12 comprises a plurality of lower refractive index portions 121 and a plurality of higher refractive index portions 122 arranged in an alternating manner. The lower refractive index portions 121 positionally correspond to the black matrix 140 in the color filter layer 14. More particularly, the orthographic projections of the lower refractive index portions 121 on the first base substrate 10 completely overlap with the orthographic projections of the black matrix 140 on the first base substrate 10.

The refractive index $n_2$ of the lower refractive index portions 121 is smaller than the refractive index $n_1$ of the light guide layer 11. Light traveling through the light guide layer 11 is totally reflected at the interface between the light guide layer 11 and the lower refractive index portions 121 back into the light guide layer 11, because total internal reflection occurs when light travels from a medium of a higher refractive index to a medium of a lower refractive index.

The higher refractive index portions 122 positionally correspond to the red light structures 141, the green light structures 142, and the blue light structures 143. More particularly, the orthographic projections of the higher refractive index portions 122 on the first base substrate 10 completely overlap with the orthographic projections of the red light structures 141, the green light structures 142, and the blue light structures 143 on the first base substrate 10.

The refractive index $n_4$ of the higher refractive index portions 122 is larger than the refractive $n_1$ of the light guide layer 11. Light traveling through the light guide layer 11 will be refracted at the interface between the light guide layer 11 and the higher refractive index portions 122, so as to be coupled out of the light guide layer 11, because refraction occurs when light travels from a medium of lower refractive index to a medium of higher refractive index. Light coupled out of the light guide layer 11 first passes through the first polarizing layer 13 to become linearly polarized light, and then passes through the red light structures 141, green light structures 142, and blue light structures 143 to become red light, green light, and blue light, respectively, before traveling toward the second substrate 200. In other words, the display panel of the present disclosure is configured to emit substantially through the higher refractive index portions of the refractive layer. Here, "substantially" means that at least 90% of the light, and preferably at least 95%, and even more preferably 100% of the light, is emitted through the higher refractive index portions.

It is understood that the present disclosure does not particularly limit the materials or compositions of the lower refractive index portions 121 and the higher refractive index portions 122, so long as the refractive indices of the lower and higher refractive index portions 121, 122 relative to the light guide layer 11 satisfy the requirements set forth in the present disclosure. For example, in a non-limiting embodiment, the refractive indices of the light guide layer 11 ($n_1$), the lower refractive index portions 121 ($n_2$), and the higher refractive index portions 122 ($n_4$) may be 1.614, 1.458, and 1.755, respectively.

The second substrate 200 is configured to generate the electric field for deflecting or orienting the liquid crystal cells in the liquid crystal layer 300. The red light, green light, and blue light that pass through the first substrate 100 travel through the liquid crystal layer, and become modulated by the liquid crystal cells. Light having a specific polarization then passes through the second polarizing layer 22, and color display and gray scale control on the display panel is achieved.

As shown in FIG. 3, each of the red light structures 141, green light structures 142, and blue light structures 143 is arranged between black matrix 140. The red, green, and blue light structures 141, 142, 143 form the red, green, and blue subpixels PR, PG, PB, respectively. The red, green, and blue subpixels PR, PG, PB constitute a pixel. In the liquid crystal display panel according to the present disclosure, light enters through the first substrate 100. Lower refractive index portions 121 and higher refractive index portions 122 are provided in the refractive layer 12. The lower refractive index portions 121 positionally correspond to the black matrix, so that difference between the light guide layer 11 having a higher refractive index than the lower refractive index portions 121 causes light to undergo total internal reflection and become trapped in the light guide layer 11. On the other hand, the higher refractive index portions 122 positionally correspond to the red, green, and blue subpixels PR, PG, PB, so that difference between the light guide layer 11 having a lower refractive index than the higher refractive index portions 122 causes light to be refracted and become coupled out of the light guide layer 11. Light that is coupled out of the light guide layer 11 is emitted only through the red, green, and blue subpixels PR, PG, PB. That is, the display panel of the present disclosure directs light to travel successively through the first polarizing layer, the color filter layer, the liquid crystal layer, and the second substrate, so as to finally generate color display and provide gray scale control. In the display panel of the present disclosure, since light enters through the first substrate 100 to be emitted through the second substrate 200, the second substrate 200 is on the viewer side of the display panel.

The present disclosure also provides a method of fabricating a liquid crystal display panel.

Generally, the method comprises providing a first substrate and a second substrate. To form the first substrate, a light guide layer, a refractive layer, a first polarizing layer, and optionally a color filter layer are formed in this order on a first base substrate. To form the second substrate, an array substrate is formed on a second base substrate. A liquid crystal layer forming material and a spacer material are applied on one of the first substrate and the second substrate. A seal member is applied on the other one of the first substrate and the second substrate. The first substrate and the second substrate are aligned and pressed together, and the seal member is cured under vacuum to bond the first substrate and the second substrate together. The second polarizing plate is then adhered onto the second substrate, so as to form the display panel according to the present disclosure.

In some embodiments, the forming of the first substrate comprises the following steps:

(1) A transparent material is deposited on the first base substrate, and then patterned to form the light guide layer. The transparent material may be deposited by any suitable means known to a person of ordinary skill in the art, including, but not limited to plasma enhanced chemical vapor deposition (PECVD). In some embodiments, the first base substrate is a reflective film composed of a suitable reflective material.

(2) A layer of low refractive index material is applied on the first base substrate, on which the light guide layer has been formed. The layer of low refractive index material is then patterned by photolithography to form the lower refractive index portions of the refractive layer. A layer of high refractive index material is applied on the first base substrate. The layer of high refractive index material is then patterned by photolithography to form the higher refractive index portions of the refractive layer. The lower refractive index portions and the higher refractive index portions combine to form the refractive layer.

It is understood that the present disclosure does not particularly limit the materials used to form the low and higher refractive index portions of the refractive layer, so long as the relative refractive indices of the materials forming the low and higher refractive index portions satisfy the requirements set forth in the present disclosure.

(3) The first polarizing layer is formed on the first base substrate, on which the light guide layer and the refractive layer have been formed, by any suitable means known to a person of ordinary skill in the art, including, but not limited to patterning process, 3D printing, inkjet printing, and the like.

(4) The black matrix is formed in a predetermined pattern on the first base substrate, on which the light guide layer, the refractive layer, and the first polarizing layer have been formed. The red light structures, green light structures, and blue light structures are formed between black matrix. The black matrix and the red light structures, green light structures, and blue light structures constitute the color filter layer. The black matrix positionally corresponds to the lower refractive index portions of the refractive layer. The red light structures, green light structures, and blue light structures positionally correspond to the higher refractive index portions of the refractive layer.

Each of the patterning steps described above may involve any suitable patterning process known to a person of ordinary skill in the art, and is not particularly limited. For example, the patterning step may comprise photoresist coating, exposure, development, etching, and photoresist stripping. Photolithography described may involve any suitable steps known to a person skilled in the art, and is not particularly limited. For example, the photolithography process may generally include layer coating, mask exposure, and development.

In some embodiments, a flattening layer and an alignment layer are formed on the first base substrate, on which the component layers described above have been formed. Alignment is then performed on the alignment layer to obtain the first substrate.

In some embodiments, the forming of the second substrate comprises performing at least one patterning step to form, on the second base substrate, gate lines, data lines, thin transistor films, pixel electrodes, and any other suitable accessories and/or components known to a person of ordinary skill in the art. An alignment layer is then formed on the second base substrate, on which the components described above have been formed. Alignment is performed on the alignment layer to obtain the second base substrate. The components of the second base substrate may be formed according to any suitable process known to a person of ordinary skill in the art.

In a display panel according to the present disclosure, the light guide layer, the refractive layer, the first polarizing layer, and optionally the color filter layer, are provided on the first base substrate to form the first substrate of the display panel. The first substrate is assembled with the second substrate to form a liquid crystal display panel. The present disclosure makes it possible to greatly reduce the thickness of the display panel, and in the process, simplifying the construction of the liquid crystal display panel. More particularly, the present disclosure configures the light guide layer as a component of the first substrate, which obviates the need for the light guide plates that are often required in conventional technologies. This in turn makes it unnecessary to provide a display panel according to the present disclosure with separate assembly of light guide plate and light guide frame, and avoids the light guide plate frame structure and film structure that are common in conventional display panels.

Further, since the first polarizing layer is configured as a component of the first substrate, the present disclosure obviates the need to adhere an external polarizing plate to the first substrate. A display panel according to the present disclosure also forgoes components such as optical thin layer and adhesive layer that would otherwise have been required for the external polarizing plate to function properly. The present disclosure thus eschews conventional film structure for the display panel.

The configurations of a display panel according to the present disclosure efficiently reduce the overall thickness of the display panel, allowing a thin or ultrathin display panel to be produced. The present disclosure simplifies the construction of the display panel, which in turn simplifies manufacturing and reduces costs. A display panel according to the present disclosure may be fabricated using existing manufacturing technologies, has excellent manufacturing compatibility, and allows easy implementation, low production cost, high product quality, and excellent applicability.

It is recognized that among known display technologies, organic light emitting diode (OLED) display panels are capable of ultrathin construction. However, an OLED display device is also more costly to produce, and has a shorter lifespan. As compared to an OLED display panel, a liquid crystal display panel according to the present disclosure offers the advantages of cheaper production costs and a longer lifespan.

It is understood that in the above descriptions of the display panel according to the present disclosure, the order in which the refractive layer 12, first polarizing layer 13, and color filter layer 14 are stacked to form the first substrate 100 is illustrative and non-limiting. The three component layers may be arranged in any suitable order known to a person of ordinary skill in the art, for example, depend on need and/or specific implementation of the display panel. For instance, in some embodiments, the color filter layer 14 may be provided on the refractive layer 13, and the first polarizing layer 13 may be provided on the color filter layer 14. In some embodiments, the color filter layer 14 is not provided in the first substrate 100, but is instead provided in the second substrate 200. Further, it is understood that the display panel may comprise any additional appropriate accessories and/or components, such as an alignment layer and/or spacers (e.g., silica nanoparticles), known to a person or diary skill in the art without departing from the scope and spirit of the present disclosure. The additional accessories and/or components may be provided between the first and second substrates 100, 200.

Figure 4:
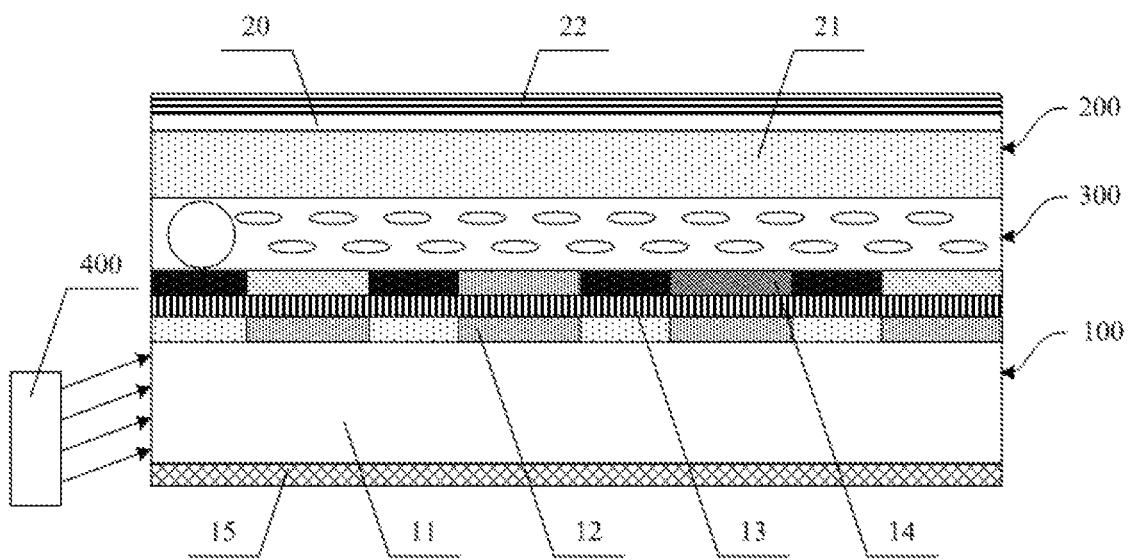
FIGS. 4-5 show schematic diagrams of liquid crystal display panels according to embodiments of the present disclosure.
Figure 5:
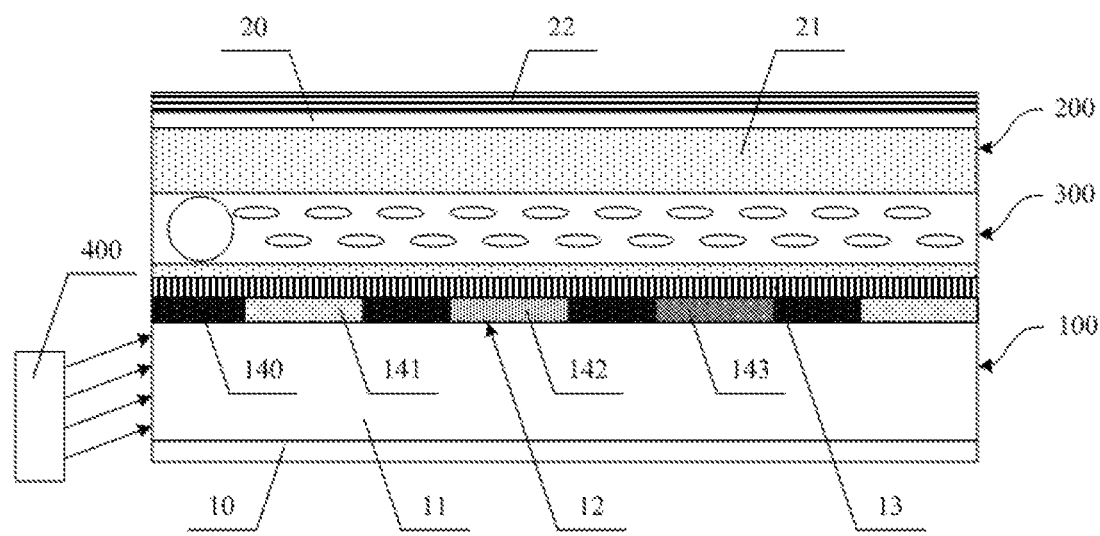

FIGS. 4-5 show schematic diagrams of liquid crystal display panels according to some embodiments of the present disclosure.

As shown in FIG. 4, the display panel comprises the first substrate 100, the second substrate 200 on the first substrate 100, and a liquid crystal layer 300 between the first substrate 100 and the second substrate 200.

The structures of the first substrate 100, the second substrate 200, and the liquid crystal layer 300 are substantially as described above, with the exception that in the embodiment illustrated in FIG. 4, the first base substrate and the light guide layer are formed as a unitary structure. In other words, the light guide layer 11 is configured to function as both the first base substrate and the light guide layer. A refractive layer 12 is provided on a side of the light guide layer 11 facing the second substrate 200. A first polarizing layer 13 is provided on the refractive layer 12, and a color filter layer 14 is provided on the first polarizing layer 13. The refractive layer 12, the first polarizing layer 13, and the color filter layer 14 form a stack on the light guide layer 11, and the direction in which the layers are arranged defines the stack direction.

Further, as shown in FIG. 4, the first base substrate 10 is a reflective film 15. The reflective film 15 ensures that light traveling through the light guide layer 11 is internally reflected at the interface between the light guide layer 11 and the reflective film 15. Reflection occurs regardless of whether the light entering the light guide layer 11 from the edge light source 400 is collimated light, and regardless of whether light enters the light guide layer 11 at an incident angle that satisfies the critical angle. In some embodiments, the reflective film 15 may be provided in addition to the first base substrate 10.

The reflective film 15 may be formed according to any suitable process known to a person of ordinary skill in the art. In some embodiments, the reflective film may be adhered to the light guide layer. In some embodiments, the reflective film may be formed on the surface of the light guide layer by coating or evaporation. In some embodiments, the structure of the first base substrate, reflective film, and light guide layer may be formed by forming the reflective film on the first base substrate, and then forming the light guide layer on the reflective film.

In the embodiment illustrated in FIG. 4, the configurations of the components other than the first base substrate and the light guide layer may be as described above, for example, for embodiments illustrated in FIGS. 1 and 3.

The configurations of the present disclosure make it possible to effectively reduce the overall thickness of the display panel, so as to better comport with the growing market demands for thinner products. Further, by greatly simplifying the structure of the display panel, the present disclosure also simplifies the manufacturing, lowers the production costs of the display panel, and improves the applicability of the display panel.

As shown in FIG. 5, the display panel comprises the first substrate 100, the second substrate 200 on the first substrate 100, and a liquid crystal layer 300 between the first substrate 100 and the second substrate 200.

The structures of the first substrate 100, the second substrate 200, and the liquid crystal layer 300 are substantially as described above, with the exception that in the embodiment illustrated in FIG. 5, the refractive layer and the color filter are formed as a unitary structure. In other words, the refractive layer is configured to both refract, and filter, light.

The first substrate 100 comprises a first base substrate 10 and a light guide layer 11 on the side of the first base substrate 10 facing the second substrate 200. The first substrate 100 further comprises a refractive layer 12 on the light guide layer 11, and a first polarizing layer 13 on the refractive layer 12. The light guide layer 11, the refractive layer 12, and the first polarizing layer 13 form a stack on the first base substrate 10, and the direction in which the layers are arranged defines the stack direction.

The refractive layer 12 comprises black matrix 140, a plurality of red light structures 141, a plurality of green light structures 142, and a plurality of blue light structures 143 arranged according to a predetermined pattern.

The black matrix 140 is opaque, and absorbs the incident light. Light traveling through the light guide layer 1 is totally reflected at the interface between the light guide layer 11 and the black matrix 140.

Further, the incident light passes through the red light structures 141, green light structures 142, and blue light structures 143, and is filtered to become red, green, and blue lights. Red, green, and blue lights then pass through the first polarizing layer 13, and are converted into linearly polarized lights before emitting through the second substrate 200. In some embodiments, to further increase the polarizing effect, a protective film may be provided on the first polarizing layer.

Here also, it is understood that the present disclosure does not particularly limit the materials or compositions of the black matrix and the red, green, and blue light structures, so long as the relative refractive indices of the component layers of the display panel of the present disclosure satisfy the requirements set forth in this disclosure. Further, the relative refractive indices of the components of the refractive layer according to the present disclosure may be achieved by any appropriate means known to a person of ordinary skill in the art. For example, a material having a low refractive index may be selected to form the black matrix, and a photoresist material having a high refractive index may be selected to form the light structures. As another example, additives may be added to known materials for forming the black matrix and the light structures to adjust the relative refractive indices.

The configurations of the embodiment illustrated in FIG. 5 make it possible to further reduce the overall thickness of the display panel, so as to better comport with the growing market demands for thinner products. Further, by greatly simplifying the structure of the display panel, the present disclosure also simplifies the manufacturing, lowers the production costs of the display panel, and improves the applicability of the display panel.

In some embodiments, a second polarizing layer is provided in the second substrate. More particularly, the second substrate may comprise a second base substrate and an array substrate on the second base substrate. The array substrate comprises the second polarizing layer. The second polarizing layer may be formed by any suitable process known to a person of ordinary skill in the art, including, but not limited to, patterning process, 3D printing, inkjet printing, or laser scanning. In some embodiments, the second polarizing layer may be formed as its own layer in the array substrate. In some embodiments, the second polarizing layer may be provided in the same layer as another component layer of the array substrate. For example, the second polarizing layer may be formed as its own layer on the second base substrate, or may be formed in the same layer as the gate lines.

By configuring the second substrate as described above, the present disclosure makes it possible to further reduce the overall thickness of the display panel, and to further simplify the construction and production of the display panel, so as to further lower the associated production costs.

The present disclosure also provides a method of fabricating a liquid crystal display panel. The structure and configuration of the liquid crystal display panel are as described above, and are not repeated here.

The method of fabricating the display panel may comprise the following steps:

In step S1, the first substrate and the second substrate are formed. The first substrate comprises the light guide layer, the refractive layer, and the first polarizing layer.

In step S2, the first substrate and the second substrate are assembled to form the display panel.

In some embodiments, the forming of the first substrate may comprise:

(1) Forming the light guide layer.

(2) Forming the refractive layer on the light guide layer, the refractive layer comprising a plurality of higher refractive index portions and a plurality of lower refractive index portions. The refractive indices of the plurality of lower refractive index portions are smaller than the refractive index of the light guide layer. The refractive indices of the plurality of higher refractive index portions are larger than the refractive index of the light guide layer.

(3) Forming the first polarizing layer on the refractive layer.

(4) Forming the black matrix and a plurality of color light structures on the first polarizing layer. The black matrix and a plurality of color light structures constitute the color filter layer. The black matrix positionally corresponds to the lower refractive index portions of the refractive layer. The plurality of color light structures positionally correspond to the higher refractive index portions of the refractive layer.

In some embodiments, the refractive layer functions doubly as the color filter layer. In those embodiments, the forming of the first substrate may comprise:

(1) Forming the light guide layer.

(2) Forming the black matrix and the plurality of color light structures on the light guide layer. The black matrix and a plurality of color light structures constitute both the refractive layer and the color filter layer. The refractive index of the black matrix is smaller than the refractive index of the light guide layer. The refractive indices of the plurality of color light structures are larger than the refractive index of the light guide layer.

(3) Forming the first polarizing layer on the refractive layer.

The forming of the light guide layer may comprise forming the light guide layer on the first base substrate. The refractive index of the first base substrate is smaller than the refractive index of the light guide layer. In some embodiments, the forming of the light guide layer may comprise forming a reflective layer on the first base substrate, and forming the light guide layer on the reflective layer. In some embodiments, the forming of the light guide layer may comprise providing a light guide layer and then forming the reflective layer on the light guide layer.

The forming of the second substrate may comprise forming an array substrate on the second base substrate.

In some embodiments, after step S2, the method may further comprise forming a second polarizing layer on a side of the second substrate opposite from the first substrate. The polarization axis of the second polarizing layer is perpendicular or substantially perpendicular to the polarizing axis of the first polarizing layer.

It is preferable that the first substrate and the second substrate be assembled in a clean room, so as to eliminate contamination by foreign matters.

In a display panel according to the present disclosure, the light guide layer, the refractive layer, the first polarizing layer, and optionally the color filter layer, are provided on the first base substrate to form the first substrate of the display panel. More particularly, the present disclosure configures the light guide layer as a component of the first substrate, which obviates the need for the light guide plates that are often required in conventional technologies. Further, since the first polarizing layer is configured as a component of the first substrate, the present disclosure obviates the need to adhere an external polarizing plate to the first substrate. A display panel according to the present disclosure also forgoes components such as optical thin layer and adhesive layer that would otherwise have been required for the external polarizing plate to function properly. The configurations of the present disclosure make it possible to effectively reduce the overall thickness of the display panel, so as to better comport with the growing market demands for thinner products. Further, by greatly simplifying the structure of the display panel, the present disclosure also simplifies the manufacturing, lowers the production costs of the display panel, and improves the applicability of the display panel.

The present disclosure also provides a liquid crystal display device.

The display device comprises a liquid crystal display panel and an edge light source. The structure and configuration of the liquid crystal display panel are as described above, and are not repeated here. A display panel according to the present disclosure may be integrated into any device configured to provide a display function, including, but not limited to, a liquid crystal display screen, a mobile phone, a tablet, a television, a computer, a display, a notebook computer, a digital photo frame, a navigation system, and any other products or components that provide a display function.

The edge light source is a side-entry light source provided on one of the two end surfaces of the light guide layer. The edge light source emits light in a direction that is at an angle to the normal to the light guide layer so that light incident on the light guide layer is totally reflected within the light guide layer. In some embodiments, the edge light source is a collimated light source. For example, a white LED with improved collimation may be used as the edge light source, or strips of CCFL tubes may be provided as a light collimator. The present disclosure does not particularly limit the structure and configuration of the edge light source, which may have any suitable structure and configuration known to a person of ordinary skill in the art.

References in the present disclosure made to the term "some embodiment," "some embodiments," and "exemplary embodiments," "example," and "specific example," or "some examples" and the like are intended to refer that specific features and structures, materials or characteristics described in connection with the embodiment or example that are included in at least some embodiments or example of the present disclosure. The schematic expression of the terms does not necessarily refer to the same embodiment or example. Moreover, the specific features, structures, materials or characteristics described may be included in any suitable manner in any one or more embodiments or examples. In addition, for a person of ordinary skill in the art, the disclosure relates to the scope of the present disclosure, and the technical scheme is not limited to the specific combination of the technical features, and also should cover other technical schemes which are formed by combining the technical features or the equivalent features of the technical features without departing from the inventive concept. Unless otherwise defined, all the technical and scientific terms used herein have the same meanings as commonly understood by one of ordinary skill in the art to which the present invention belongs. Terms such as "first," "second," and so on, are not intended to indicate any sequence, amount or importance, but distinguish various components. Terms such as "comprises," "comprising," "includes," "including," and so on, are intended to specify that the elements or the objects stated before these terms encompass the elements or the objects and equivalents thereof listed after these terms, but do not preclude the other elements or objects. Phrases such as "connect", "connected", and the like, are not intended to define a physical connection or mechanical connection, but may include an electrical connection, directly or indirectly. Terms such as "on," "under," "right," "left" and the like are only used to indicate relative position relationship, and when the position of the object which is described is changed, the relative position relationship may be changed accordingly.

The principle and the embodiment of the present disclosures are set forth in the specification. The description of the embodiments of the present disclosure is only used to help understand the embodiments of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A liquid crystal display panel, comprising:
a light guide layer having a first refractive index,
a refractive layer on the light guide layer,
a first polarizing layer on the refractive layer,
a color filter layer on the first polarizing layer,
a liquid crystal layer on the color filter layer, and
an array substrate on the liquid crystal layer,
wherein the refractive layer comprises a plurality of higher refractive index portions having a second refractive index and a plurality of lower refractive index portions having a third refractive index, the plurality of higher refractive index portions and the plurality of lower refractive index portions being arranged in an alternating manner,
wherein the second refractive index is larger than the first refractive index,
wherein the third refractive index is smaller than the first refractive index, and
wherein the liquid crystal display panel is configured to emit light substantially through the higher refractive index portions of the refractive layer.

2. The liquid crystal display panel according to claim 1, wherein a difference between the second refractive index and the first refractive index is sufficient to couple light out of the light guide layer into the plurality of higher refractive index portions.

3. The liquid crystal display panel according to claim 1, wherein a difference between the third refractive index and the first refractive index is sufficient to cause total internal reflection at an interface between the light guide layer and the plurality of lower refractive index portions.

4. The liquid crystal display panel according to claim 1, wherein the light guide layer is composed of a transparent material.

5. The liquid crystal display panel according to claim 1, wherein the light guide layer is composed of glass.

6. The liquid crystal display panel according to claim 1, further comprising a first base substrate on a side of the light guide layer opposite from the refractive layer,
  wherein the first base substrate has a fourth refractive index, and
  wherein the fourth refractive index is smaller than the first refractive index.

7. The liquid crystal display panel according to claim 6, wherein the first base substrate is a reflective film.

8. The liquid crystal display panel according claim 1,
  wherein the color filter layer comprises a plurality of black matrix portions and a plurality of color light structures,
  wherein the plurality of black matrix portions and the plurality of color light structures are arranged in an alternating manner,
  wherein the plurality of black matrix portions positionally correspond to the plurality of lower refractive index portions of the refractive layer, and
  wherein the plurality of color light structures positionally correspond to the plurality of higher refractive index portions of the refractive layer.

9. The liquid crystal display panel according to claim 8,
  wherein orthographic projections of the plurality of lower refractive index portions on the light guide layer completely overlap with orthographic projections of the plurality of black matrix portions on the light guide layer, and
  wherein orthographic projections of the plurality of higher refractive index portions on the light guide layer completely overlap with orthographic projections of the plurality of color light structures on the light guide layer.

10. The liquid crystal display panel according to claim 1,
  wherein the refractive layer comprises a plurality of black matrix portions and a plurality of color light structures,
  wherein the plurality of black matrix portions constitute the plurality of lower refractive index portions, and
  wherein the plurality of color light structures constitute the plurality of higher refractive index portions.

11. The liquid crystal display panel according to claim 1, wherein a thickness of the light guide layer is from 100 nm to 10 µm.

12. The liquid crystal display panel according to claim 1, wherein the array substrate comprises a second polarizing layer, and
  wherein a polarization axis of the first polarizing layer is perpendicular to a polarization axis of the second polarizing layer.

13. A display device, comprising:
  the display panel according to claim 1, and
  an edge light source on an end surface of the light guide layer.

14. The display device according to claim 13, wherein the edge light source is configured to emit a collimated light.

15. A method of fabricating the display panel according to claim 1, comprising:
  forming the light guide layer,
  forming the refractive layer on the light guide layer, and
  forming the first polarizing layer on the refractive layer,
  wherein the forming of the refractive layer comprises:
  applying a layer of lower refractive index material on the light guide layer, and performing a first patterning step to form the plurality of lower refractive index portions, and
  applying a layer of higher refractive index material on the light guide layer, and performing a second patterning step to form the plurality of higher refractive index portions.

16. The method according to claim 15,
  wherein the lower refractive index material is a black matrix material, and
  wherein the higher refractive index material is a photoresist having a larger refractive index than the first refractive index.

17. The method according to claim 15, further comprising,
  before forming the light guide layer, providing a reflective layer,
  wherein the light guide layer is formed on the reflective layer.

18. The method according to claim 15, further comprising forming a first base substrate out of a material having a smaller refractive index than the first refractive index,
  wherein the light guide layer is formed on the first base substrate.

19. The method according to claim 18, wherein the material forming the first base substrate is a reflective material.

* * * * *